United States Patent [19]

Armstrong

[11] 4,047,920
[45] Sept. 13, 1977

[54] APPARATUS FOR CHARGING AN ELECTRIC GLASS FURNACE AND METHOD OF COMPLETELY DISTRIBUTING GLASS BATCH OVER THE SURFACE OF MOLTEN GLASS IN AN ELECTRIC GLASS FURNACE

[75] Inventor: Thomas M. Armstrong, Chattanooga, Tenn.

[73] Assignee: Chattanooga Glass Company, Chattanooga, Tenn.

[21] Appl. No.: 711,867

[22] Filed: Aug. 5, 1976

[51] Int. Cl.$^2$ .................. C03B 3/00; C03B 13/00
[52] U.S. Cl. ................................. 65/335; 65/135
[58] Field of Search .................. 65/335, 146, 135

[56] References Cited

U.S. PATENT DOCUMENTS

| | | | |
|---|---|---|---|
| 3,167,191 | 1/1965 | Zellerr, Jr. | 65/335 X |
| 3,486,874 | 12/1969 | Rough | 65/335 X |
| 3,780,889 | 12/1973 | Frazier et al. | 65/335 X |
| 3,980,460 | 9/1976 | Nelson et al. | 65/335 X |

Primary Examiner—S. Leon Bashore
Assistant Examiner—Frank W. Miga
Attorney, Agent, or Firm—Stevens, Davis, Miller & Mosher

[57] ABSTRACT

An apparatus for charging an electric glass furnace having a bottom, first and second opposing sidewalls, and first and second opposing end walls. The apparatus includes hoppers for receiving glass batch from a source and for discharging the glass batch into the furnace. Each of the hoppers has an upper inlet end and a lower outlet end extending along the upper edge of one of the end walls of the furnace. One of the hoppers extends inwardly from the first sidewall along the edge and the other one of the hoppers extends inwardly from the second sidewall along the edge with the hoppers spaced from each other along the edge. A pusher drum, rotatable about a substantially horizontal axis, is associated with each of the hoppers. Each of the drums is parallel to the edge but spaced therefrom with the outlet end of the associated hopper therebetween. The drums are substantially axially aligned and axially spaced from each other and from the respective sidewall from which the associated drum extends. Each of the drums is substantially coextensive with its associated hopper except for the spacing from the respective sidewall. Upon rotation of the drums, the glass batch from the hoppers is completely distributed by the drums over the surface of molten glass in the furnace in a direction from the edge toward the opposite end wall.

9 Claims, 5 Drawing Figures

APPARATUS FOR CHARGING AN ELECTRIC GLASS FURNACE AND METHOD OF COMPLETELY DISTRIBUTING GLASS BATCH OVER THE SURFACE OF MOLTEN GLASS IN AN ELECTRIC GLASS FURNACE

BACKGROUND OF THE INVENTION

1. Field of the Invention

This invention relates to glass manufacturing and, more particularly, the invention relates to an apparatus for charging an electric glass furnace and a method for completely distributing glass batch over the surface of molten glass in an electric glass furnace to form a complete batch cover or blanket over the molten glass.

2. Description of the Prior Art

In the manufacture of glass, unmelted glass making materials, such as scrap glass or cullet, sand, limestone, soda ash, feldspar, etc., are charged into one end of the furnace where they are melted and delivered through a throat for further processing thereof. The glass batch is electrically heated in the furnace. As the unmelted glass-making materials are fed into the furnace, the unmelted batch ingredients float on the surface of molten glass in the furnace to form a batch cover or blanket.

In the prior art, it has been difficult to form a complete batch cover or blanket over the surface of hot molten glass in the furnace. As a result, areas of hot glass are often exposed through openings in the batch cover, for example along the sidewalls of the furnace or in the vicinity of the end wall opposite the one on which the charger is mounted. The openings in the batch cover allow the heat to escape from the furnace so that additional power input is needed to heat the glass, resulting in consequential increased operating cost. In addition to this problem, the uncovered areas create numerous operating problems. In an effort to overcome these problems, the batch composition or formulas are often altered in an attempt to compensate for the uncovered areas. Additionally, crusted areas may form over these uncovered areas of that glass which can result in eruption or foaming over of the glass from the furnace. Such eruption or foaming over is extremely dangerous because of the high temperatures involved and results in otherwise unnecessary machine down time and consequential increased operating costs.

Also, in the prior art, the batch ingredients freely fell from the charger into the furnace, thereby causing a severe dust problem, because of the fine ingredients used, which creates both a health and a pollution problem.

SUMMARY OF THE INVENTION

An object of this invention is to provide a complete batch cover or blanket over the surface of molten glass in an electric glass furnace.

An additional object of this invention is to charge an electric glass furnace without creating severe batch dust from the batch ingredients.

An additional object of this invention is to provide a complete batch cover or blanket over the surface of molten glass in an electric glass furnace without exposing any areas of hot glass.

A further object of this invention is to melt glass in an electric glass furnace with a minimum amount of heat loss and minimum power.

A further object of this invention is to provide a complete batch cover or blanket over the surface of molten glass in an electric glass furnace to thereby avoid foaming over or eruption of the molten glass from the furnace.

A further object of this invention is to provide a complete batch cover or blanket over the surface of molten glass in an electric glass furnace through which gases from the melting batch may escape.

These objects and others will become apparent from the following description of the invention with reference to the accompanying drawing wherein.

DESCRIPTION OF THE PREFERRED EMBODIMENTS

Figure 1:
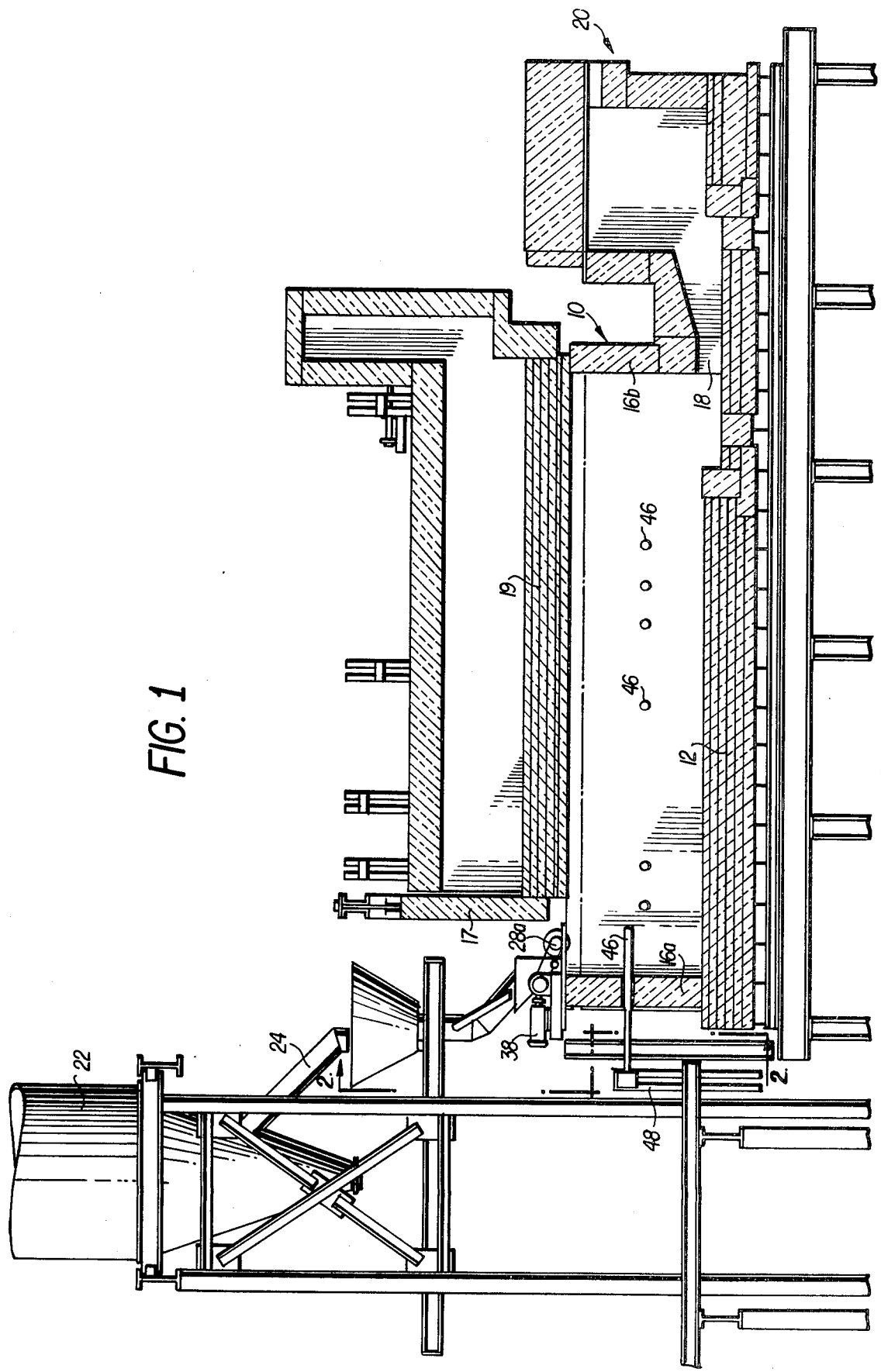
FIG. 1 is a side view partly in section of the invention.

As shown in the drawings, the invention includes a glass furnace 10 having a bottom 12, a pair of opposing sidewalls 14a, 14b, a pair of opposing end walls 16a, 16b, a suspended vertically movable curtain wall 17, and a crown 19. Adjacent the lower end of the end wall 16b is an outlet or throat 18 through which the molten glass moves from the furnace into a forehearth 20 where the molten glass is conditioned for subsequent processing thereof. The curtain wall 17 and the crown 19, which extends over the top of the furnace, function to retain heat in the furnace 10.

Figure 2:
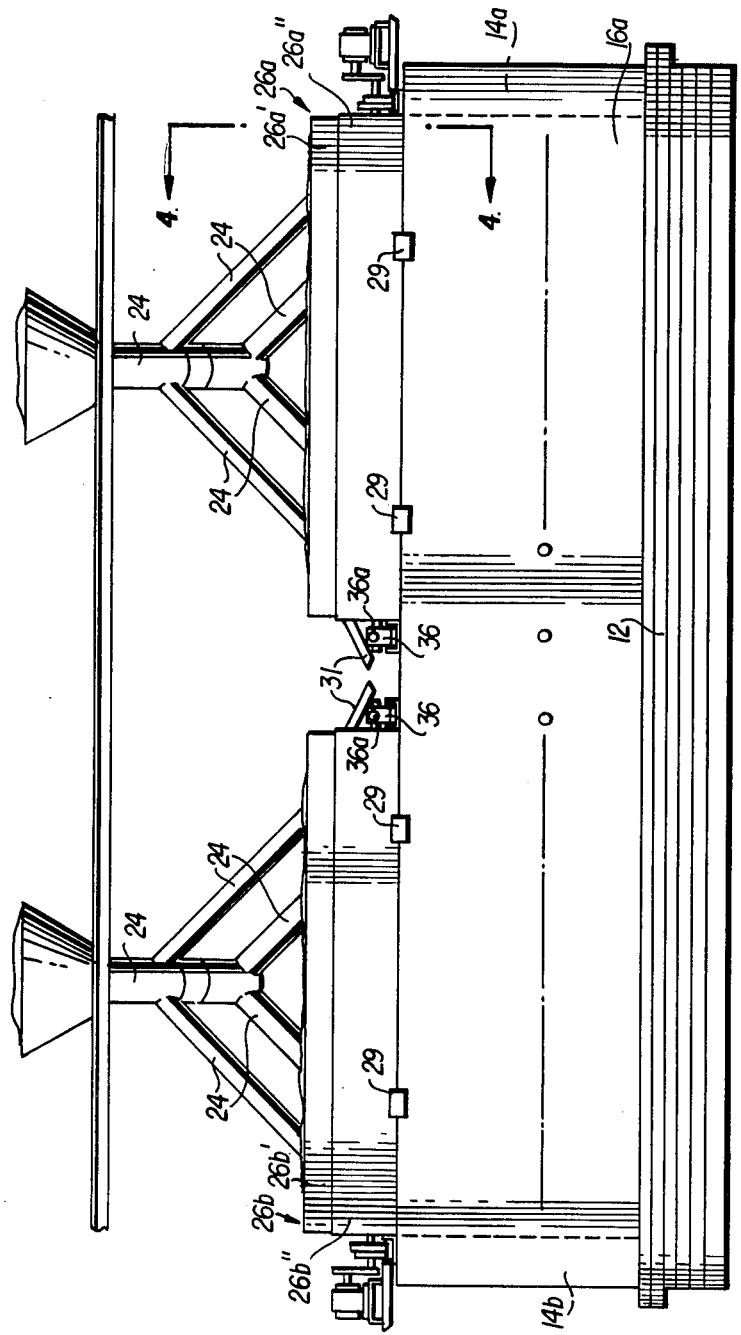
FIG. 2 is a cross-sectional view of the invention along line 2—2 of FIG. 1.
Figure 3:
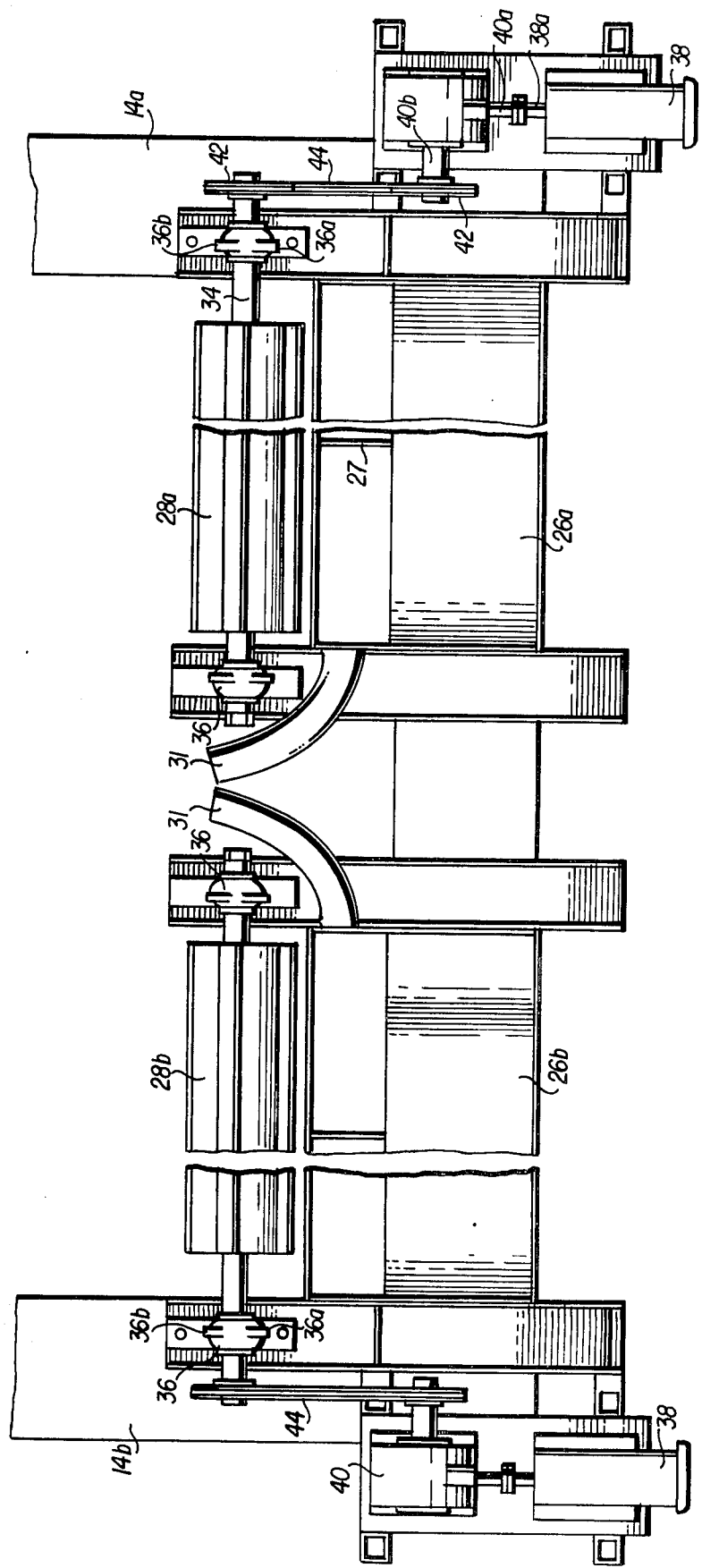
FIG. 3 is a plan view on an enlarged scale of part of the invention shown in FIG. 1.
Figure 4:
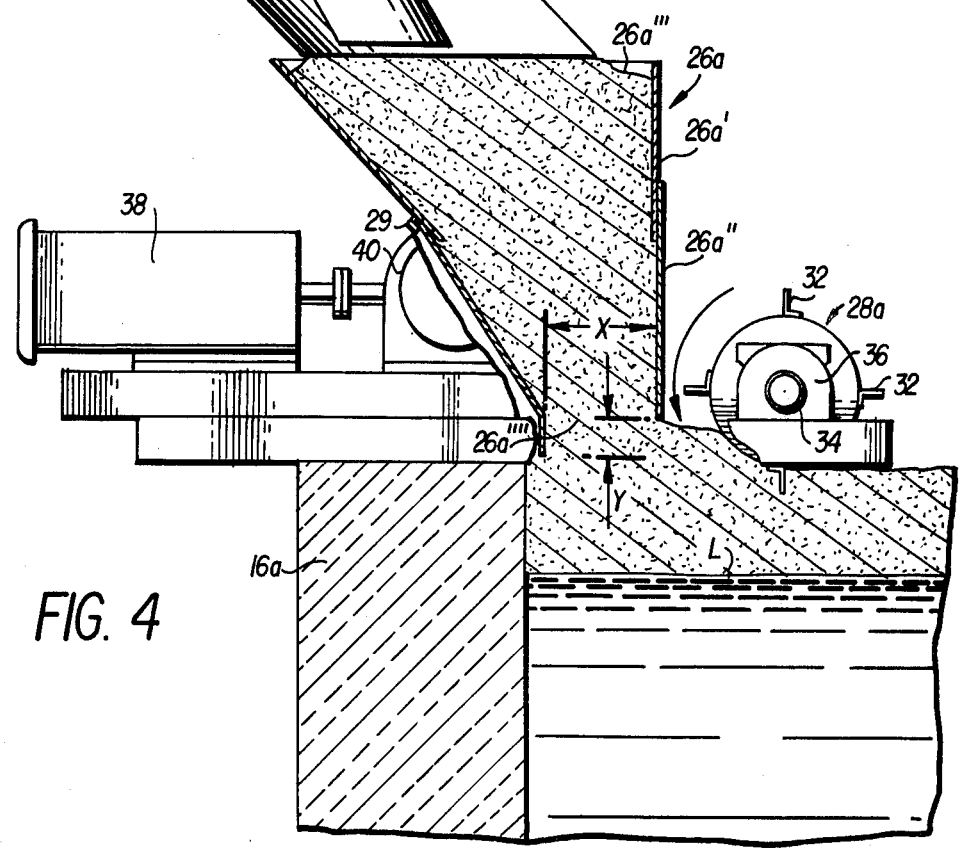
FIG. 4 is a cross-sectional view of the invention along line 4—4 of FIG. 2.

Above the end 16a of the 16a of is a storage bin 22, mounted on supports, for glass batch meterials such as scrap glass or cullet, sand, limestone, soda ash, feldspar, etc. From the bin 22, the batch materials can flow by gravity through tubes 24 into a pair of hoppers 26a, 26b. Each hopper 26a, 26b includes an upper section 26a', 26b' and a lower section 26a'', 26b''. The upper section includes hooks 29 on the lower end thereof which hook over the lower section to engage the two sections together. As shown in FIG. 4, the hopper 26a includes a wide upper inlet end 26a''', and a narrow lower outlet end 26'''' positioned along the upper edge of the end wall 16a. The same is true of the hopper 26b. As shown in FIG. 3, the hoppers may be reinforced by stiffener plates 27. As shown in FIG. 2, the hopper 26a extends inwardly from the sidewall 14b along the upper edge of the end wall 16a and terminates short of the longitudinal center line of the furnace. The other hopper 26b likewise extends inwardly from the sidewall 14b along the upper edge of the end wall 16a toward the other hopper 26a amd terminates short of the longitudinal center line of the furnace.

Between the hoppers 26a, 26b are a pair of ducts 31. One of the ducts 31 is connected to an opening in one end wall of hopper 26a and the other duct 31 is connected to an opening in one end wall of the hopper 26b. From the connection to their respective hoppers, each duct 31 extends downwardly and toward the other hopper. Batch material from the hoppers 26a, 26b passes through the ducts 31 for discharge into the space between the hoppers 26a, 26b.

As is apparent from FIG. 4, glass batch material can flow from the outlet ends of the hoppers 26a, 26b into the furnace and rest on the surface of molten glass in the furnace beneath a pair of associated pushers 28a, 28b and between the pushers and the end wall 16a. The pushers 28a, 28b are axially aligned and axially spaced from each other. Also, the pusher 28a is spaced inwardly from the sidewall 14a of the tank as shown in FIG. 3. In similar fashion and to the same extent, the pusher 28b is spaced inwardly from the sidewall 14b. Each of the pushers 28a, 28b comprises a drum 30 and four axially extending blades 32, circumferentially spaced from each other about the drum, projecting radially from the surface of the drum. Each drum 30 is fixedly mounted on a hollow shaft 34 rotatably supported at its ends in bearing assemblies 36. The pushers 28a, 28b are driven by electric motors 38 through a drive mechanism which includes a gear box 40, pulleys 42, and a belt 44.

One of the pulleys 42 is keyed to the output shaft 40b of the gear box 40 and the other pulley 42 is keyed to the hollow shaft 34. Upon actuation of the motors 38, their output shafts 38a drive the input shafts 40a and output shafts 40b of the gear boxes 40 to rotate the pulleys 42 and the belts 44 to thereby rotate the hollow shafts 30 and the pushers 28a, 28b.

Figure 5:
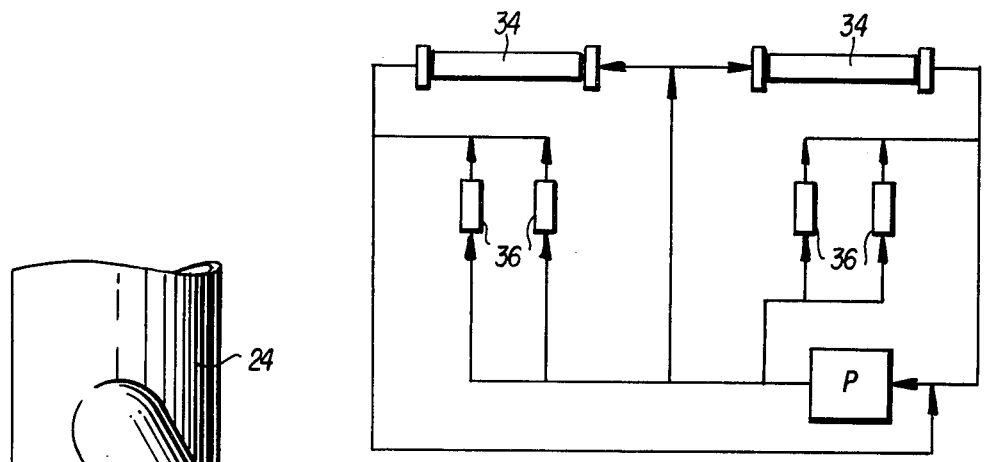
FIG. 5 is a cooling fluid circuit diagram.

As discussed above, the pushers 28a, 28b are rotatable on hollow shafts 34. Water or other cooling liquids may be circulated for example by a pump through the hollow shafts 34 to cool the drums 28a, and 28b. Additionally, the bearing assemblies provide jackets about the bearings for the shafts so that water or other cooling liquids may be circulated for example by a pump and may enter the jackets through the inlets 36a therein and depart through outlets 36b therein to cool the bearings. As shown in FIG. 5, water or other cooling fluid may be circulated through the hollow shafts 34 and the bearings assemblies 36 by a pump P and conduits connecting the pump P to the shafts 34 and the bearing assemblies 36. Because the shafts 34 are rotatable, rotary unions may be provided on the ends thereof for connection of the conduits thereto.

Heat is supplied to the molten glass in the furnace through a plurality of electrodes 46 extending into the furnace from the sidewalls 14a, 14b and end walls 16a, 16b thereof. The electrodes 46 are connected outside the furnace to bus bars 48, one of which is shown in FIG. 1, which is connected to an electrical source.

In operation, assuming the furnace 10 is filled to an appropriate level L with molten glass, as the level of the molten glass goes below some predetermined limit, a switch is activated to connect the motors 30 to an electrical source to thereby rotate the pushers 28a, 28b through the gear box 40, the pulleys 42, and the belt 44. Upon rotation in the direction of the arrow in FIG. 4, the drums mechanically push or paddle the fresh batch material, which floats on the molten glass, along the surface thereof in a direction from the upper edge of the end wall 16a toward the other end wall 16b. A continual supply of fresh batch material is provided from the hoppers 26a, 26b and from the bin 22 for distribution by the pusher drums 28a, 28b over the surface of molten glass in the furnace. As a result of the invention, a complete batch cover or blanket is provided over the surface of the molten glass. This batch cover or blanket provides an extremely good insulator to retain the heat in the furnace. Also, the batch cover or blanket is porous so that the gases from the melting batch can escape through the batch cover or blanket. As a result, the molten glass in the furnace will not erupt or foam over.

The particular positioning and spacing of the hoppers and pushers and ducts between the hoppers as described above is extremely important to achieve the desired complete batch cover or blanket over the surface of the molten glass in the furnace. By spacing the hoppers and pushers from each other as described above with the ducts between the hoppers, a complete batch cover or blanket is obtained over the entire surface of the molten glass in the furnace, including in particular the region in which the pushers are spaced from each other along the longitudinal center line of the furnace. Also, if the pushers were to extend to the sidewalls and not be spaced therefrom, applicant has found that although a generally satisfactory cover or blanket is obtained, there are some open areas in the batch cover adjacent the sidewalls which do not completely cover the molten glass and consequently create the undesired hot spots. Applicant has found that by spacing the pushers a short distance for example four inches from the sidewalls, a complete batch cover or blanket is obtained along the sidewalls.

In a particular embodiment of the invention, the furnace has a depth of 54 inches, the sidewalls 14a, 14b have an inside length of 20 feet, the end walls 16a, 16b have an inside length of 15 feet, and the level of molten glass is desirably maintained to a height of 49 inches. The hoppers are six foot, 6 inches long, their inlet ends have a width of 19½ inches and their outlet ends have a width of four inches. (designated X in FIG. 4). The lower edge of the front wall of each hopper, adjacent the drum, is four inches above the lower edge of the rear wall of each hopper adjacent the end wall 16a (dimension Y in FIG. 4). The pushers are 6 foot, one inch long and the rolls are 8 11/16 inches in diameter with four radially projecting two and one half inch long blades. The pusher 28a is spaced 4 inches from the sidewall 14a and the pusher 28b is spaced 4 inches from the sidewall 14b. The hoppers 26a, 26b are spaced from each other by a distance of 2 feet, i.e., one foot to each side of the longitudinal center line of the furnace. The pushers 28a, 28b are spaced from each other by a distance of 2 feet, 2 inches, i.e. 1 foot, 1 inch to each side of the longitudinal centerline of the furnace. The pushers then extend over approximately 78.92% of the width of the furnace, the 2 foot, 2 inch spacing between the pushers is approximately 14.05% of the width of the furnace, and the four inch spacing of each pusher from the sidewall is approximtely 2.16% of the width of the furnace. The molten glass in the furnace is desirable maintained at a temperature of approximately 2,675° F and the pushers 28a, 28b rotate at approximately 5 to 10 rpm.

It is evident from the above that this invention relates to a novel apparatus for charging an electric glass furnace and method for completely distributing glass batch over the surface of molten glass in an electric glass furnace.

What is claimed is:

1. An apparatus for charging an electric glass furnace having opposing end walls and opposing sidewalls, said apparatus comprising:
   stationary means for discharging a gravitating bed of glass batch onto the surface of molten glass in the furnace along one end wall thereof in a zone extending substantially from one sidewall to the other, and
   two pushers parallel and adjacent to but spaced from the said stationary means for pushing succeeding portions of the batch resting on the molten glass along the surface of said molten glass toward the opposing end wall, said pushers being substantially axially aligned but axially spaced from each other and from said sidewalls.

2. An apparatus for charging an electric glass furnace as claimed in claim 1, wherein:

said pushers each comprise a drum rotatable about a substantially horizontally extending axis and a plurality of blades extending radially from the surface of the drum.

3. An apparatus for charging an electric glass furnace having a bottom, first and second opposing sidewalls, and first and second opposing end walls, said apparatus comprising:

a pair of stationary hoppers adapted to receive glass batch and to discharge the same in the form of a moving bed onto the surface of molten glass in the furnace, each of said hoppers having an upper inlet end and a lower outlet and extending end to and along the upper edge of one of the end walls of the furnace, one of said hoppers extending inwardly from the first sidewall along said edge and the other one of said hoppers extending inwardly from the second sidewall along said edge, said hoppers being spaced from each other along said edge, means between said hoppers for discharging glass batch in the form of a moving bed onto the surface of molten glass in the furnace in the space between said hoppers, a pusher, rotatable about a substantially horizontal axis, located adjacent but laterally spaced from the outlet end of each of said hoppers, each of said pushers being parallel to said edge but spaced therefrom with the outlet end of the associated hopper therebetween, said pushers being substantially axially aligned and axially spaced from each other and from the respective sidewall from which the associated pusher extends, each of said pushes being substantially coextensive with the width of the outlet end of the respective hopper except for the spacing from the respecting sidewall whereby the glass batch is completely distributed by the pushers over the surface of molten glass in the furnace.

4. An apparatus for charging an electric glass furnace as claimed in claim 3, wherein:

each of said pushers comprises a drum and a plurality of blades extending radially from the surface of the drum.

5. An apparatus for charging an electric glass furnace as claimed in claim 4, further comprising means to rotate said drums in a direction such that the lower ends thereof move in a direction away from the outlet ends of the hoppers.

6. An apparatus for charging an electric glass furnace as claimed in claim 4, further comprising:

means for cooling the drums.

7. An apparatus for charging an electric glass furnace as claimed in claim 4, further comprising:

bearings for rotatably supporting said drums, and means for cooling said bearings.

8. An apparatus for charging an electric glass furnace as claimed in claim 4, wherein:

each hopper is a mirror image of the other on each side of a vertical plane through the longitudinal center line of the furnace, and each drum is a mirror image of the other on each side of the plane.

9. An apparatus for charging an electric glass furnace as claimed in claim 3, wherein:

said means between said hoppers comprises a pair of ducts, one of said ducts being connected to an end wall of one of said hoppers and extending downwardly therefrom and toward the other hopper and the other of said ducts being connected to an end wall of the other one of said hoppers and extending downwardly therefrom and toward said one hopper.

* * * * *